(12) United States Patent
Schlecht et al.

(10) Patent No.: US 7,458,634 B2
(45) Date of Patent: Dec. 2, 2008

(54) REAR SEAT BACK WITH HEIGHT-ADJUSTABLE CENTER ARMREST

(75) Inventors: Werner Schlecht, Vaihingen/Enz Aurich (DE); Jürgen Salewski, Düsseldorf (DE); Hartmut Bohlke, Wuppertal (DE); Wolfgang Sitzler, Wuppertal (DE); Olaf Büschgens, Willich (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/712,735

(22) Filed: Mar. 1, 2007

(65) Prior Publication Data

US 2007/0205638 A1 Sep. 6, 2007

(30) Foreign Application Priority Data

Mar. 3, 2006 (DE) .................. 10 2006 010 376

(51) Int. Cl.
*B60N 2/46* (2006.01)

(52) U.S. Cl. .................. 297/113; 297/112; 297/115; 297/117; 297/411.2; 297/411.3; 297/411.32; 297/411.46; 297/238

(58) Field of Classification Search .................. 297/113, 297/112, 115, 117, 411.2, 411.3, 411.32, 297/411.46, 238
See application file for complete search history.

(56) References Cited

U.S. PATENT DOCUMENTS

| | | | | |
|---|---|---|---|---|
| 1,835,947 A | * | 12/1931 | Johannsen | 297/113 |
| 3,168,346 A | * | 2/1965 | Rei, Jr. | 297/113 |
| 3,191,995 A | * | 6/1965 | Shelton | 297/117 X |
| 3,666,319 A | * | 5/1972 | Moloney, Jr. | 297/113 |
| 3,779,600 A | * | 12/1973 | Quakenbush | 297/411.3 |
| 5,104,182 A | * | 4/1992 | Rasnick et al. | 297/113 |
| 5,433,503 A | * | 7/1995 | De Filippo | 297/115 |
| 5,540,479 A | * | 7/1996 | Thomas et al. | 297/113 |
| 5,628,543 A | * | 5/1997 | Filipovich et al. | 297/113 |
| 5,658,043 A | * | 8/1997 | Davidson | 297/113 |
| 5,752,739 A | * | 5/1998 | Saeki | 297/113 |
| 6,220,660 B1 | * | 4/2001 | Bedro et al. | 297/411.32 |
| 6,547,323 B1 | * | 4/2003 | Aitken et al. | 297/113 |
| 6,572,188 B2 | * | 6/2003 | Ozawa | 297/238 |
| 7,178,865 B2 | * | 2/2007 | Yetukuri et al. | 297/113 |
| 2004/0160080 A1 | * | 8/2004 | Shibata et al. | 296/64 |
| 2007/0069561 A1 | * | 3/2007 | Schnabel et al. | 297/238 |

FOREIGN PATENT DOCUMENTS

| EP | 0670241 A1 | 9/1995 |
|---|---|---|
| EP | 0751037 A1 | 1/1997 |
| GB | 2194305 A | 3/1988 |

* cited by examiner

*Primary Examiner*—Rodney B. White
(74) *Attorney, Agent, or Firm*—Leydig, Voit & Mayer, Ltd.

(57) ABSTRACT

A center armrest for rear seat backs of cars that comprises an armrest upper part and an armrest lower part that are joined together by means of a hinge located at an end face of the armrest. Within a hollow central portion of the armrest, a control mechanism is provided by which the thickness of the armrest is automatically adjusted when the armrest is swiveled down from an out-of-use position where it functions as part of the seat back into the armrest position.

32 Claims, 8 Drawing Sheets

REAR SEAT BACK WITH HEIGHT-ADJUSTABLE CENTER ARMREST

FIELD OF THE INVENTION

The present invention relates to armrests for motor vehicle seats, and more particularly to an armrest is movable between a folded-up position between left and right sections of the seat and a folded-down position extending forwardly of the seat back.

BACKGROUND OF THE INVENTION

In larger-sized cars today, center armrests are customary. The rear seat back is divided into two sections, a left and a right section, creating an intermediate space in the center. The central intermediate space often also is used to provide a pass-through opening so as to accommodate, for example, skis in the passenger compartment when necessary. These are too long to fit in the trunk space, and often are shoved into the passenger compartment from the trunk space in a ski bag. When not being used, this opening is closed by a piece of cushion which can serve as a center armrest. When folded up, the cushion forms a back rest for a third passenger in the middle of the rear seat bank.

In other car configurations without a pass-through arrangement, a center armrest still is provided, making it possible to sit in the middle when it is folded up, and when folded down it has the aforesaid armrest function for the two rear passengers. In currently known configurations for the center armrest, only one usable height is available, depending on the structural thickness of the center armrest and its swivel axis.

OBJECTS AND SUMMARY OF THE INVENTION

It is an object of the invention to provide a center armrest for passenger cars that is more flexible in function and usage.

In this new seat design, typically a back seat, an intermediate space is provided in a known manner between the left and the right section, where a center armrest is hinged. When folded up, it forms a continuous extension of the rear seat back, and when folded down it provides a roughly horizontal armrest surface.

In keeping with the invention, the new center armrest is divided into two parts, one forming the lower part and the other the upper part in relation to the armrest position. These two parts are joined together by a hinged joint. The distance between the lower part and the upper part can be varied by means of an adjustment mechanism. By reason of such arrangement, it is easily possible to place the armrest surface formed on the upper part at a desirable height.

Furthermore, the height adjustability of the upper part can be used to create the largest possible continuous opening for a pass-through opening. In this case, the center armrest is hinged as low as possible in the vicinity of the seat surface. By folding down the center armrest while folding up the upper part relative to the lower part, the armrest has very low height, and it frees up a large area in the partition wall between passenger compartment and trunk space. In this position, the armrest surface is at a very low height and no longer serves its function as an armrest. It functions now as a fold-down part of the back rest of the seat. Due to the adjustability of the upper part relative to the lower part, the upper part can be placed in a position that enables comfortable support of the arm on the cushion.

Relatively simple structural support is achieved by the armrest swiveling about a fixed axis which is located in the intermediate space between the two sections of the back rest. The axis runs horizontally, as well as transversely to the longitudinal axis of the vehicle. The mechanism for achieving height adjustability naturally interacts with the lower part of the center armrest and engages with the swivel or pivot axis on the lower part.

To create the biggest possible pass-through opening, the axis is located in the vicinity of the lower edge of the rear seat back. In the most simple case, the axis is formed by a continuous rod. It can also be formed by two individual bolts or rivet bolts, if the configuration of the lower part of the armrest allows for this.

Preferably, the upper part of the armrest carries a cushioned surface which faces upwardly when the armrest is folded down. Similarly, the lower part of the armrest preferably is provided with a cushioned surface as well so that the armrest can serve as a cushioned back rest when the armrest is folded up.

Especially simple and stable structural relationships are produced when the upper part of the armrest has two side walls and one end wall. In similar manner, the lower part of the armrest can be formed cuplike so that there are again exists two side walls and one end wall. The end walls of the upper and lower part face upwardly when the armrest is folded up.

The armrest parts of roughly cuplike form can be telescoped one in the other so that the inner space is always closed off from the outside by the overlapping side walls. At the same time, this affords an antijamming effect. A large travel and at the same time a relatively slight swivel of the angle of the upper part is achieved if the hinged joint is arranged in the region of the forward end of the armrest, which points upwardly when the armrest is folded up.

In the simplest case, the hinged joint is a hinge such that the two parts of the armrest can only swivel relative to each other about a hinge axis running horizontally and transversely to the longitudinal axis of the armrest and the motor vehicle so that the hinge axis lies parallel to a swivel axis, about which the armrest can swivel back and forth between the two functional positions. The mechanism for swiveling the upper part of the armrest relative to the lower part can be configured such that when the armrest is swung down into the armrest position, the upper part of the armrest is automatically moved away from the lower part by a particular distance. It also is possible to configure the mechanism such that said distance is adjustable.

A very simple configuration is achieved when the mechanism for the automatic movement of the upper part of the armrest relative to the lower part has a cam track. The cam track can be in approximately centered in relation to the width of the armrest. Improved support is achieved by arranging two cam tracks next to the sides of the armrest. This necessarily avoids any twisting of the upper part relative to the longitudinal axis even if its natural rigidity is insufficient to do so. On the other hand, the use of a single cam track is better in terms of design in so far as the adjustability of the travel is concerned.

Moreover, the mechanism preferably has a control lever that interacts with the respective cam track. If the length of the control lever is adjustable, one can in this way easily change the distance the upper part of the armrest is swung away from the lower part when the armrest is swung down. The design conditions are simplified if the control lever can move in the lower part of the armrest about an axis parallel to the swivel axis.

The control lever can alternatively be configured as a one-arm or a two-arm lever. In the case of a two-arm lever configuration, one of the arms interacts with the cam track and the other is joined by a coupling lever to a fixed abutment. In order to adjust the travel, it is possible in principle to adapt the design of the one or the other arm accordingly. Advisedly, however, the arm that interacts with the cam track is made adjustable in length since this is the longer arm, thus creating more favorable space conditions.

When using a one-arm lever as the control lever, a stop is provided that is fixed in place and limits the swivel motion of the one-arm lever in the same direction of turning as the swivel motion of the armrest when folding down. With the assistance of a spring, the lever can be resiliently tensioned against this stop.

The length-adjustable lever or arm has two elongated parts that are guided one on the other. The two parts are tensioned by a spring, preferably in the direction of a prolongation of the arm or lever consisting of the two parts. This has the effect that when there is no load on the center armrest, the upper part of the armrest is moved upward simply by releasing the locking mechanism.

The adjusting device advantageously is a detent device which can be released by the user at will. The detent device is configured such that a spontaneous movement is not possible when the upper part of the armrest is under load. It also is possible to achieve a locking in both directions if the detent device is configured accordingly.

Other objects and advantages of the invention will become apparent upon reading the following detailed description and upon reference to the drawings, in which:

Figure 1:
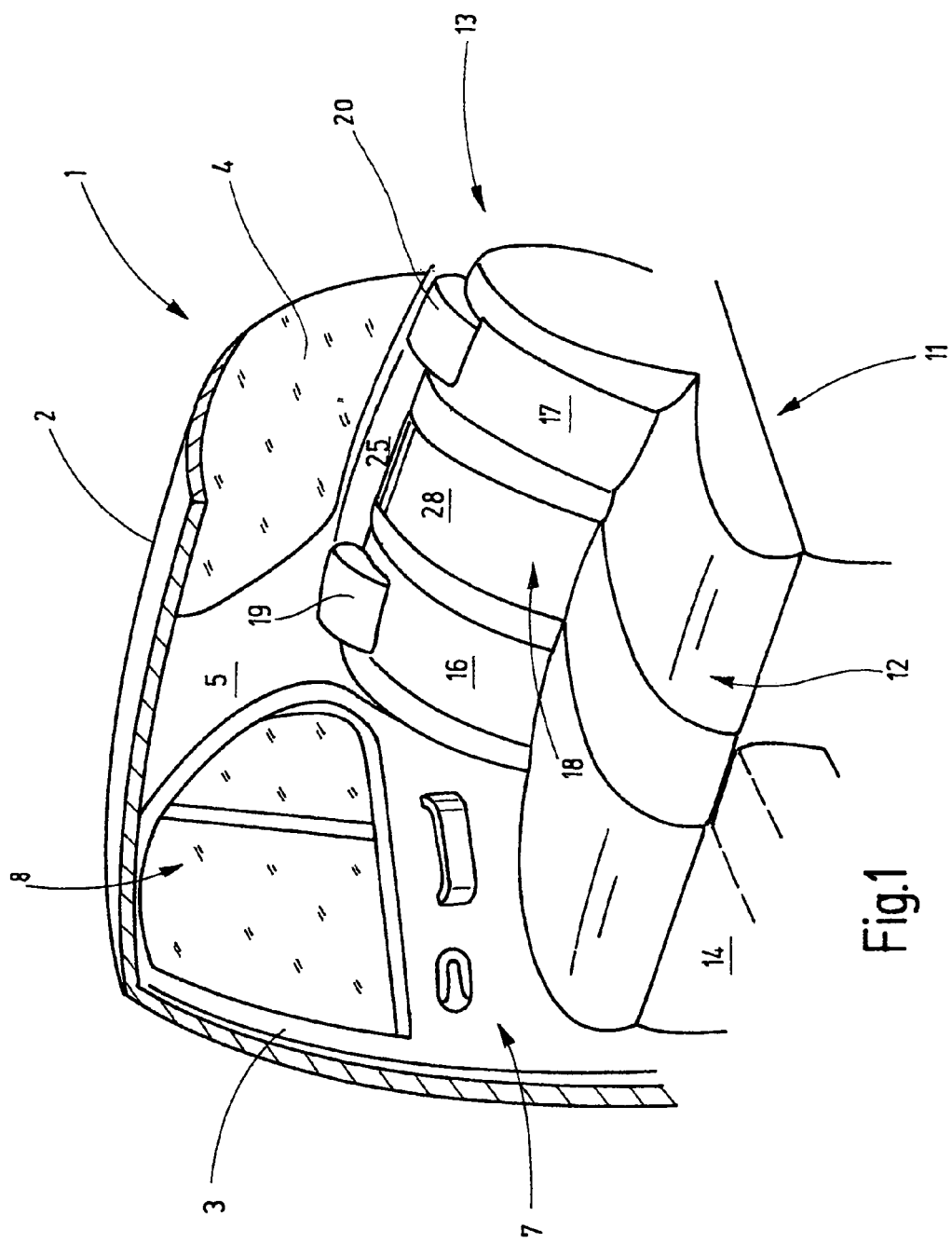
FIG. 1 is a broken-open perspective of a rear area of a car having a back seat armrest in accordance with the invention, showing the armrest in a folded-up position.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particular to the drawings, there is shown a car having a back seat with a center armrest in accordance with the invention. The illustrated car has a car body with a roof 2 from which B-columns 3 extend downwardly at sides to a floor assembly in a conventional manner. The roof has a rear edge that extends along a rear window 4. The rear window ends at C-columns 5 which again are conventionally located at a distance from the B-columns 3 and which carry an interior lining of the car. Between the B and C columns 3, 5, rear side doors 7 are hinged, which each have a window 8.

At the height of the rear side door 7 there is a rear seat 11, consisting of a sitting surface 12 and a rear back rest 13. The sitting surface 12 lies on a base surface 14, which is part of the floor assembly and in which foot areas 14 are formed. Just underneath the upper edge of the rear back rest 13 there is a hat storage space 25 extending to the lower edge of the rear windshield 4.

The rear back rest 13 is divided into a right section 16 and a left section 17, which are separated from each other by an intermediate space. In this intermediate space is located a back rest section 18, which in another functional position forms a center armrest and is therefore also so designated hereafter. The center armrest 18 is hinged in the vicinity of its lower edge, but the swivel axis can also lie in the vicinity of that surface which faces forward when the center armrest 18 is folded up. In the folded up position, the center armrest 18 completely fills the space between the two seat back sections 16, 17. In this way, a third or emergency seat is produced. Head rests 19, 20 are located at the top edge of the seat back sections 16, 17.

Figure 2:
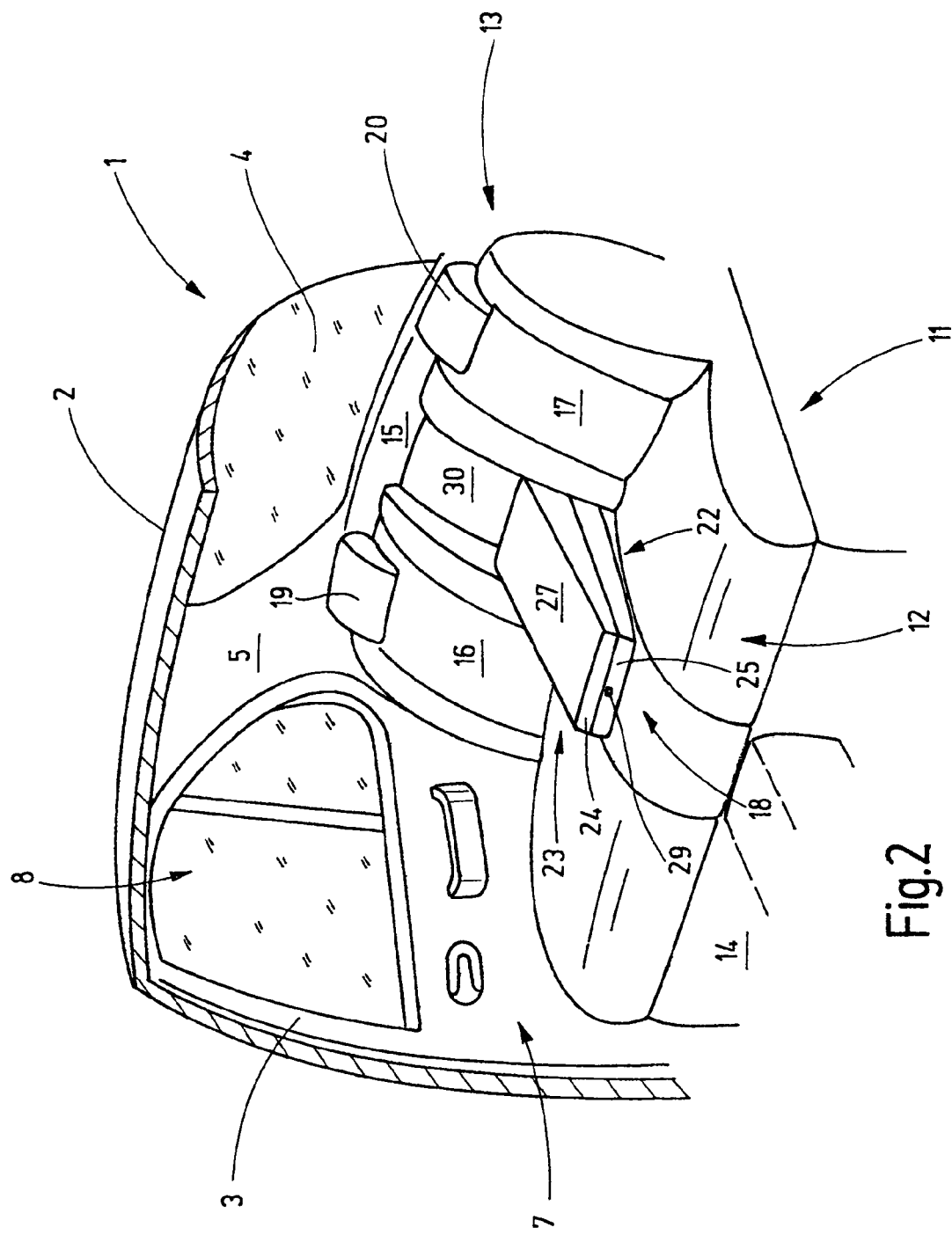
FIG. 2 is a perspective, similar to FIG. 1, showing the center armrest in a folded-down position with greater thickness.

While FIG. 1 shows the folded-up condition of the center armrest 18, FIG. 2 shows the folded-down condition. As can be seen from FIG. 2, the center armrest 18 is comprised of a center armrest lower part 22 and an upper part 23, hereinafter called merely the lower part and the upper part. The upper part 23 and the lower part 22 each form end faces 24, 25, which run essentially as a prolongation of each other and in the folded-down condition of FIG. 2. In the folded-down condition, the end faces 24, 25 point forwardly and in the folded-up condition of FIG. 1 they point upwardly. In the vicinity of the two end faces 24, 25, the upper part 23 is hinged onto the lower part 22, which in turn can swivel between the two seat back sections 16, 17.

A mechanism 26 inside the center armrest 18 (FIG. 4) controls the relative movement between the upper part 23 and the lower part 22. In the folded-down condition, a surface of the upper part 23 of the center armrest 18 forms an arm support surface 27 which lies roughly horizontal in the position of use. The lower part 22, on the other hand, forms a back support surface 28 in the folded-up position.

The overall width of the two end faces 24, 25 corresponds to the depth of the two back rest sections 16, 17 in the region of their upper edge so that in the folded-up condition of FIG. 1, a continuous line is produced at the upper edge of the back support 13. In the folded-up condition, furthermore, the back surface 28 fills in the space between the two seat back sections 16 and 17.

The function of the illustrated center armrest 18 is as follows: in the folded-up condition as depicted in FIG. 1, the center armrest 18 serves as a back support for the third center seat of the rear seat bank 11. When the center seat is not being used, the center armrest 18 can be folded from the position of FIG. 1 into the position of FIG. 2. In this process, it swivels about an axis situated in the vicinity of the back surface 28 and at the lower edge of the lower part 22. The axis lies horizontal and, furthermore, transverse to the longitudinal axis of the vehicle.

Furthermore, during the folding down, the mechanism 26 makes sure that the upper part 23 is swiveled upward relative to the lower part 22 in order to place the arm support surface 27 at a desired comfortable height. During this swivel motion, the thickness of the center armrest 18 increases at the end away from the end faces 24, 25. Whereas in the folded-up condition the thickness of the center armrest 18 at this position corresponds to the thickness of the two back sections 16, 17. In the folded-down condition, it is considerably thicker. Downward swivel movement can be limited either by the back surface 28 of the armrest 18 lying against the seat 12, or by means of appropriate internal stops.

Figure 3:
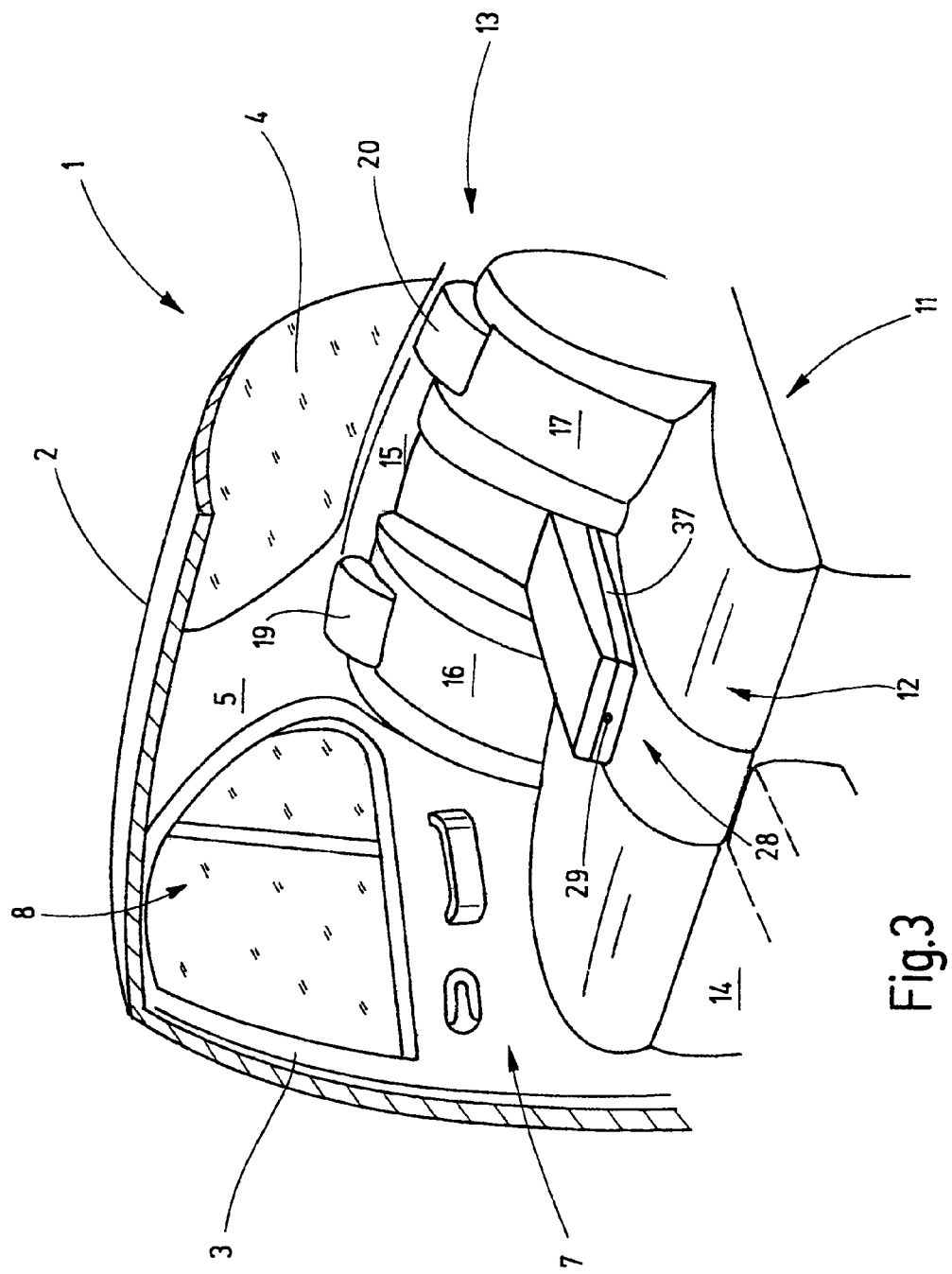
FIG. 3 is a perspective, similar to FIG. 2, showing the armrest in a contracted or folded-together condition.

When the mechanism 26 is configured accordingly, furthermore, the thickness of the center armrest 18 can be changed at the end away from the end faces 24, 25, as depicted in FIG. 3. For this, one can press down on an activating button 29. The upper part 23 can then be pressed down in the direction of the lower part 22. This adjustability can be used either to place the arm support surface 27 at a favorable height or to completely free up a pass-through opening (not shown) contained between the bulkhead partition 30 between the passenger compartment and the trunk space.

Figure 4:
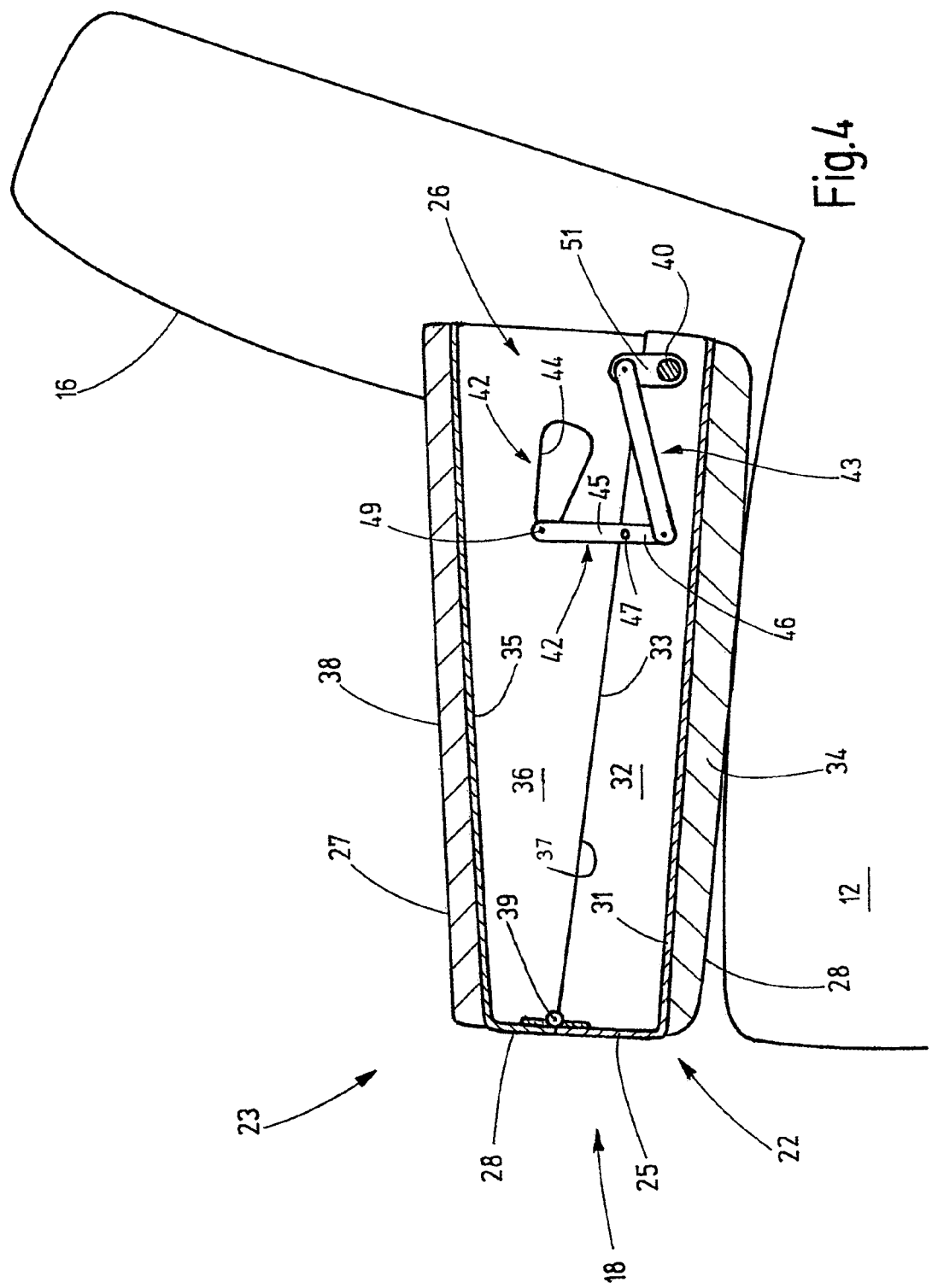
FIG. 4 is a longitudinal section of the center armrest shown in FIGS. 1-3, showing the mechanism for moving the upper part of the armrest between raised and lowered positions relative to a lower part of the armrest.
Figure 5:
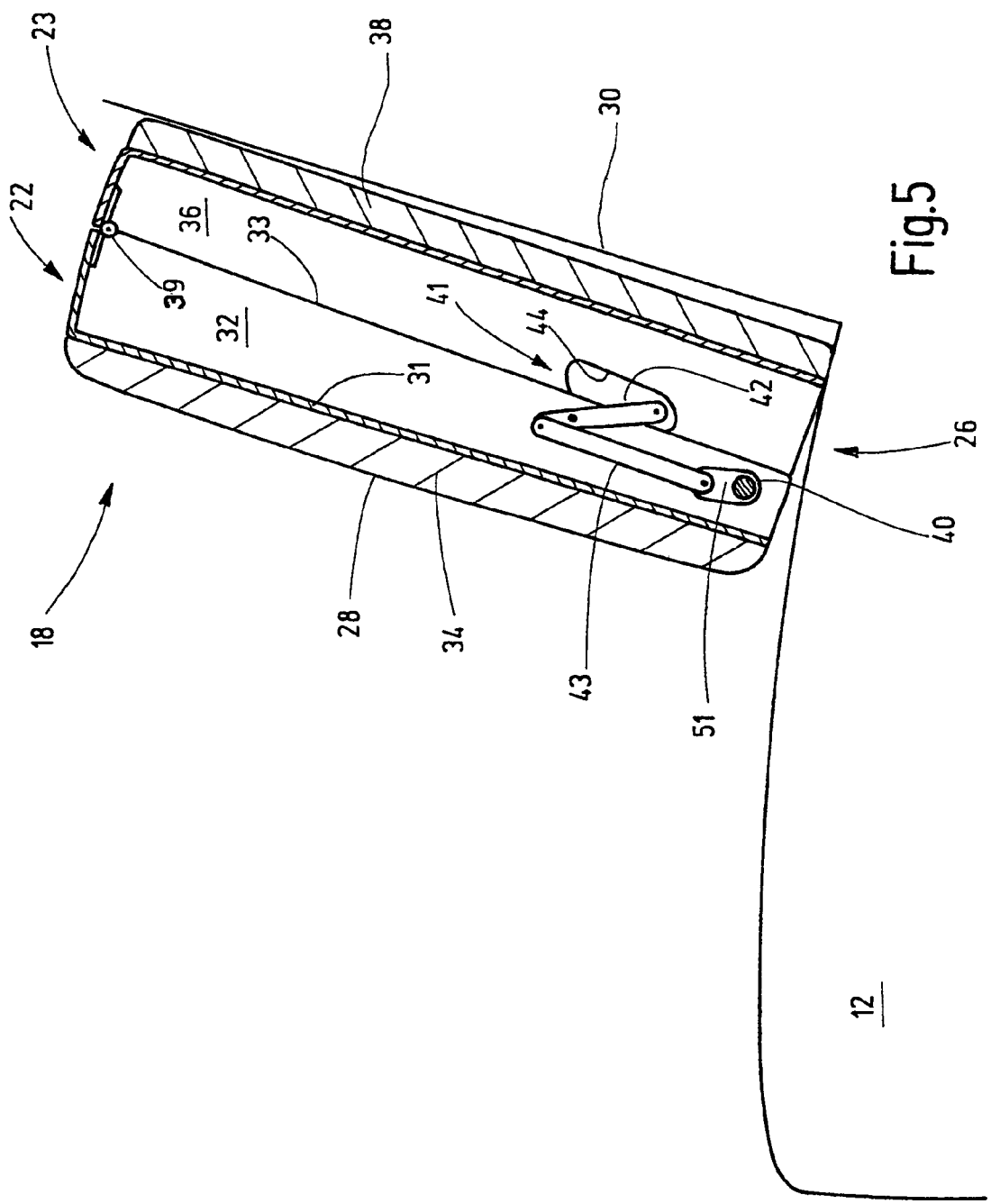
FIG. 5 is a section, similar to FIG. 4, showing the armrest in a folded-up and contracted condition.
Figure 6:
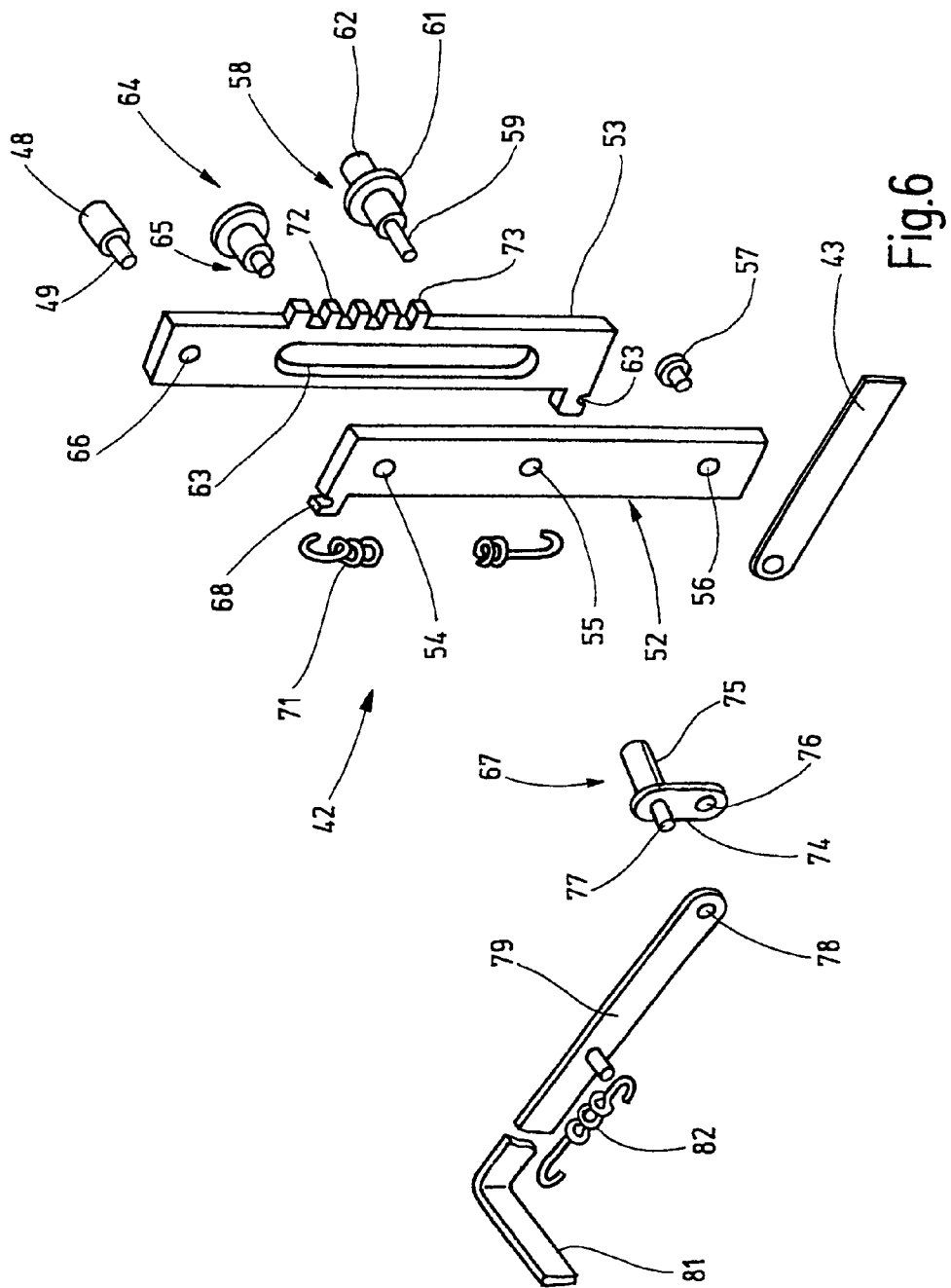
FIG. 6 is an exploded perspective of an embodiment of a control lever used with the armrest shown in FIG. 4 for changing the position of the upper armrest part relative to the lower armrest part.

For automatically swiveling of the upper part 22 relative to the lower part 23 when the center armrest 18 is swung back and forth between its two operating positions, a mechanism 26 is provided, as depicted in FIGS. 5 and 6. As can be seen in FIG. 4, the lower part 22 has a form like a shell, being open to the top and to the rear, i.e., to the right as viewed in FIG. 4. It comprises a base plate 31, the already mentioned end face 25, and two side walls 32, which run roughly parallel to each other and at a right angle to the base plate 31. The side walls 32 ends at an upper edge 33. Depending on the configuration, the base plate 31 can be in the form of a single piece of sheet metal with the side walls 32 and the end face 25. On the outside of the base plate a cushion 34 is fixed for forming the back support surface 28. The cushion 34 in this case covers the entire surface of the base plate 31, and its dimensions correspond to the intermediate space between the two seat back sections 16, 17 and the sitting surface 12.

The upper part 23 has a similar construction resembling a shell, being open at the bottom and at the rear, as viewed in FIG. 4. The upper part 23 includes a base plate 35, the mentioned end face 24, and two side walls 36. The side walls 36 terminate at an upper edge 37 (FIG. 3). On the outside of the base plate 35 there is a cushion 38, whose outside represents the arm support surface 27.

The upper part 23 overlaps by its two side walls 36 the side walls 32 of the lower part 22, and in such a way that preferably no scissors-like vertical gap between the upper edge 33 and the upper edge 37 of the two armrest parts 22, 23 is produced in any functional position. The two armrest parts 22, 23 are joined to each other by a hinge 39 arranged on the inside of the two end faces 24, 25. The axis of the hinge 39 is normal to the plane of the drawing and thus at a right angle to the longitudinal axis of the center armrest 18, i.e., transverse to the longitudinal axis of the vehicle. In the folded-up position, this axis lies on top of the parts 22, 23.

The mechanism 26 controlling movement between the upper part 23 and the lower part 22 includes a pocket 41, a control lever 42, and a coupling lever 43. The center armrest is linked to the vehicle by means of the lower part 22. For this, an axle rod 40, which defines a pivot axis, passes through the two side walls 32 at the appropriate position and is anchored to the motor vehicle such that it does not rotate. The corresponding boreholes in the side walls 32 and any slots in the side walls 36 for the passage of the axle rod 40 are concealed in the drawing and thus cannot be seen.

The pocket 41 is closed on the outside and forms at its upper edge (top of the drawing) a cam track 44, which runs approximately parallel to the base plate 35. Its precise dimensions can be determined for the particular circumstances.

The control lever 42 is a two-arm lever made having arms 45, 46. At the junction between the two arms 45 and 46, the control lever 42 is pivoted on an axis 47, schematically indicated in the drawing. It can be formed by a corresponding rivet, which is fastened in the side wall 32 in proximity to the upper edge 33. The control lever 42 can easily swivel on this rivet about an axis lying parallel to the axis of the axle rod 40. Its positioning will be understood from the functional description that follows. Basically, as the drawing depicts, it lies roughly perpendicular beneath the cam track 44.

Figure 7:
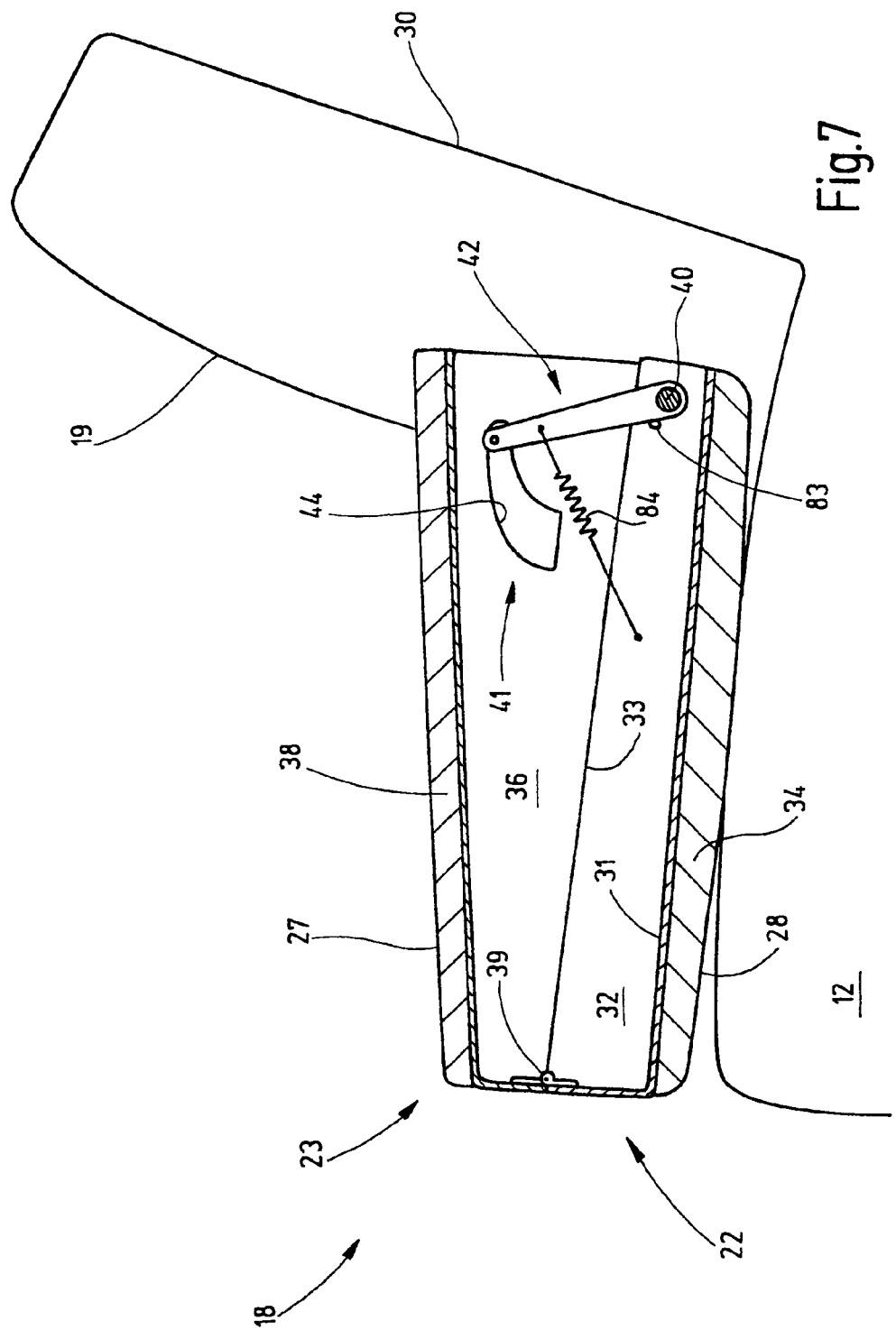
FIGS. 7 and 8 are fragmentary sections of an armrest with an alternative embodiment of mechanism for moving an upper part of the armrest between raised and lowered positions with respect to a lower part.

At the free end of the arm 45 there is riveted a contoured-following pin 48 that protrudes into the pocket 44 and interacts with the cam track 44 (FIG. 7). Only the rivet head 49 of the pin can be seen.

The free end of the other arm 46 is linked to the coupling lever 43. The coupling lever 43 joins the arm 46 to an upwardly extending bracket 51, which is fixed on the axle rod 40 inside the lower part 22. It is arranged so that it does not collide with the base plate 31 in any swivel position.

The mechanism 26 also can be present in mirror image in the region of the cutaway side walls 32, 36 so as to achieve a corresponding support for the upper part 23 relative to the lower part 22 on both sides. But given sufficient stiffness to prevent twisting, it would be sufficient to provide a single pocket 41 as a corresponding opening in a central wall located in the middle between the two side walls 36. The middle placement would facilitate the adjustability of the travel, which will be discussed later on. In the case of only a single mechanism 26, stiffness against twisting would be provided by the hinge 39.

The function of the mechanism 26 is as follows: in the folded-up position as shown in FIG. 5, the center armrest 18 lies with its cushion 38 against a bulkhead partition 30. The upper part 23 is folded together to the utmost with the lower part 22 to minimize the thickness so the center armrest 18 does not stand out beyond the surface of the two seat back sections 16, 17. In the folded-up position as depicted in FIG. 5, furthermore, the control lever 42 is swung on its axis so that it extends at a very acute angle relative to the upper edge 33. In this way, it is situated in the rear or lower part of the cam track 44. Moreover, the contoured-following pin 48 is in this way brought up next to the upper edge 33. Thus, it does not limit the folding motion. In addition, given an appropriate configuration of the edge of the pocket 41 opposite the cam track 44, the upper part 23 is actively pulled against the lower part 22 by the movement of the pin 48 in order to prevent movement between the cushion 38 and the bulkhead partition 30.

Starting from this position, if the user swivels the center armrest 18 down from the position of FIG. 5 to the position of FIG. 4, the relative motion via the coupling lever 43 causes a rotary motion of the control lever 42 in the counterclockwise direction, as viewed in the drawing. Thus, the control lever 42 is oriented toward the upper edge 33, and the pin 48 is brought into a position at maximum distance from the upper edge 33 or the ground plate 31. By appropriate configuration of the cam track 44, one can ensure that the upper part is swung a desired distance from the lower part 22. The swivel movement occurs about the axis of the hinge 39. The force for this is applied, as is apparent from the drawings, in proximity to the rear edge of the center armrest 18 and, thus, at a place far away from the hinge 39. When folding up, the coupling lever 43 in conjunction with the fixed bracket 51 ensures that the control lever 42 turns in the clockwise direction relative to the axis 47 so that the pin 48 is moved toward the base plate 31. Hence, the upper part 23 is able to swivel toward the lower part 22 in order to adjust the thickness in the region of the rear edge of the center armrest 18 to the thickness at the two side surfaces 24 and 25.

The folding down of the upper part 23 can occur either by means of its own weight if the position of the pin 48 allows for such a movement, or if the pocket 41 is configured appropriately, the pin 48 can act against the edge or margin of the pocket 41 opposite the cam track 44 and pull the upper part 23 toward it.

It can be seen from FIG. 4 that the swivel travel, executed by the upper part 23 relative to the lower part 22 when the center armrest 18 is swiveled back and forth between the two positions shown in FIGS. 4 and 5, can be selectively determined by changing the length of the arm 45. FIG. 6 shows a portion of the mechanism 26 for effecting a desired arm length change.

The control lever 42, as depicted in FIG. 6, consists of two rods 52, 53. The two rods 52 and 53 each have a flat, rectangular profile, and in the assembled condition they lie with their flat sides against each other. The rod 52 is formed with three boreholes 54, 55 and 56 made one above the other on the same axis. A rivet 57 is positioned in borehole 56 and links the control lever 42 to the coupling rod 43. The rivet 57 has a shaft that passes through the borehole 56 and a corresponding borehole in the coupling brace 43.

The borehole 55 forms an axle bore by means of which the control lever 42 is pivoted on the axis 47. This axis is formed by a rivet 58 having a step shaft 59 extending from a rivet head 61. The rivet head 61 in this case carries another shaft 62 opposite the shaft 59 by which the rivet 58 is secured in the side wall 32.

The elongated plate like rod 53 has an oblong hole 63 with parallel edges running parallel to the longitudinal length of the rod 53. The width of the oblong hole 53 corresponds to the thicker region of the shaft 59 of the rivet 58.

In the assembled condition, an additional rivet 64 is passed through the oblong hole and likewise has a step shaft 65. The part of the shaft 65 with the thicker diameter is adapted to the width of the oblong hole 63 and has the same length as the larger diameter section of the shaft 59. The length of these regions with larger diameter on the two shafts 59, 65 corresponds to the thickness of the rod 53. Above the oblong hole 63, the rod 53 has a borehole 66 receiving the shaft 49 of the pin 48 which is riveted in it.

In the assembled condition, the shaft 65 of the rivet 64 extends through the oblong hole 63 and into the borehole 54 where the rivet 64 is riveted. The shaft 59 likewise extends through the oblong hole 63, but it is movable in the lengthwise direction of the oblong hole 63 relative to the rivet 64 while protruding from the borehole 55. The projecting portion of the shaft 59 serves as a bearing for a detent 67. By reason of the two rivets 58, 64 operating in the oblong hole 63, a parallel guidance system is achieved making it possible to move the rod 53 relative to the rod 52 in the longitudinal direction of the two rods 52, 53 with little play.

At the upper end of the rod 52 and at the lower end of the rod 53 there are arms 68, 69, respectively. These two arms 68 and 69 are spaced apart from each other and serve as an abutment for a tension spring 71. Due to the tension spring 71, the rods 52, 53 are tensioned against each other so that the contour-following pin 48 has the greatest possible distance from the pivot axis 47 and the borehole 55.

At the side away from the arms 68, 69, several teeth 72 are provided one above the other on the narrow side of the rod 53, with gaps 73 formed there between. The detent 67 consists of a bracket 74 and a detent lug 75 formed on the bracket 74. There is a borehole 76 formed in the bracket 74 for pivotably supporting the detent 67 on the shaft 59. Due to its shape, the detent 67 can engage with the teeth gaps 73. In the assembled condition, the shaft 59 is riveted so that the detent 67 can turn loosely about the shaft.

Displaced to the side next to the bearing borehole 76, the bracket 74 carries a pin 77, which points in the opposite direction of the detent lug 75. An activating rod 79 with a corresponding borehole 78 is mounted on the pin 77 and extends at its far end into a cross brace 81. An activating button 29 is fastened to the cross brace 81. By means of a tension spring 82, the activating rod 79 is pretensioned so that the detent lug 75 is pretensioned in the teeth gaps 73.

The mode of operation is as follows: when the center armrest 18 is folded down as shown in FIG. 4, the user can press the activating button 29. In this way, the activating rod 79 is pushed lengthwise against the action of the tension spring 82. Due to the pushing, the detent 67 is swiveled and its detent lug 75 is released from the particular teeth gap 73 in which it was situated prior to activating the activating button 29. If the user does not bear down on the upper part 23 in this position, the tension spring 71 will move the rod 53 upward until the lower curved edge of the oblong hole 63 lies against the shaft 59. Thus, the center armrest 18 has the maximum thickness in the region of its rear end. However, if the user bears down on the upper part 23, the upper part 23 will be forced down and this pushes the rod 53 downward relative to the rod 52, until the upper edge of the oblong hole 63 lies against the shaft 65. Thus, the armrest 18 has the least thickness in the region of its rear edge, corresponding to FIG. 3.

During the lengthwise movement of the rod 53, the rod 52 remains stationary in the lower part 22. The vertical activating force with which the user bears on the upper part 23 is produced by the axis 47 and absorbed by the rivet 58.

After reaching the correct setting position, the user releases the activating button 29, whereupon the spring 82 can pull the activating rod 79 back into the starting position. In this way, the detent 67 is swiveled on the pin 59, and the detent lug 75 is admitted into the corresponding teeth gap 73. The end of the swivel motion is reached when the detent lug has reached the bottom of the teeth gap 23. The detent lug 75, when it is sitting in the teeth gap 73, prevents any lengthwise movement of the rod 53 relative to the rod 52.

As follows from the foregoing, the segment of the rod 53 extending above the borehole 55 forms the arm 45, while the rod 52 in the region between the borehole 55 and the borehole 56 represents the arm 46. When the control lever 42 has its shortest extent, as depicted in FIG. 6, the contour-following pin 48 accordingly makes a circular arc movement on a circle with a smaller radius. For this reason, the pocket 44 is approximately triangular in shape.

Figure 8:
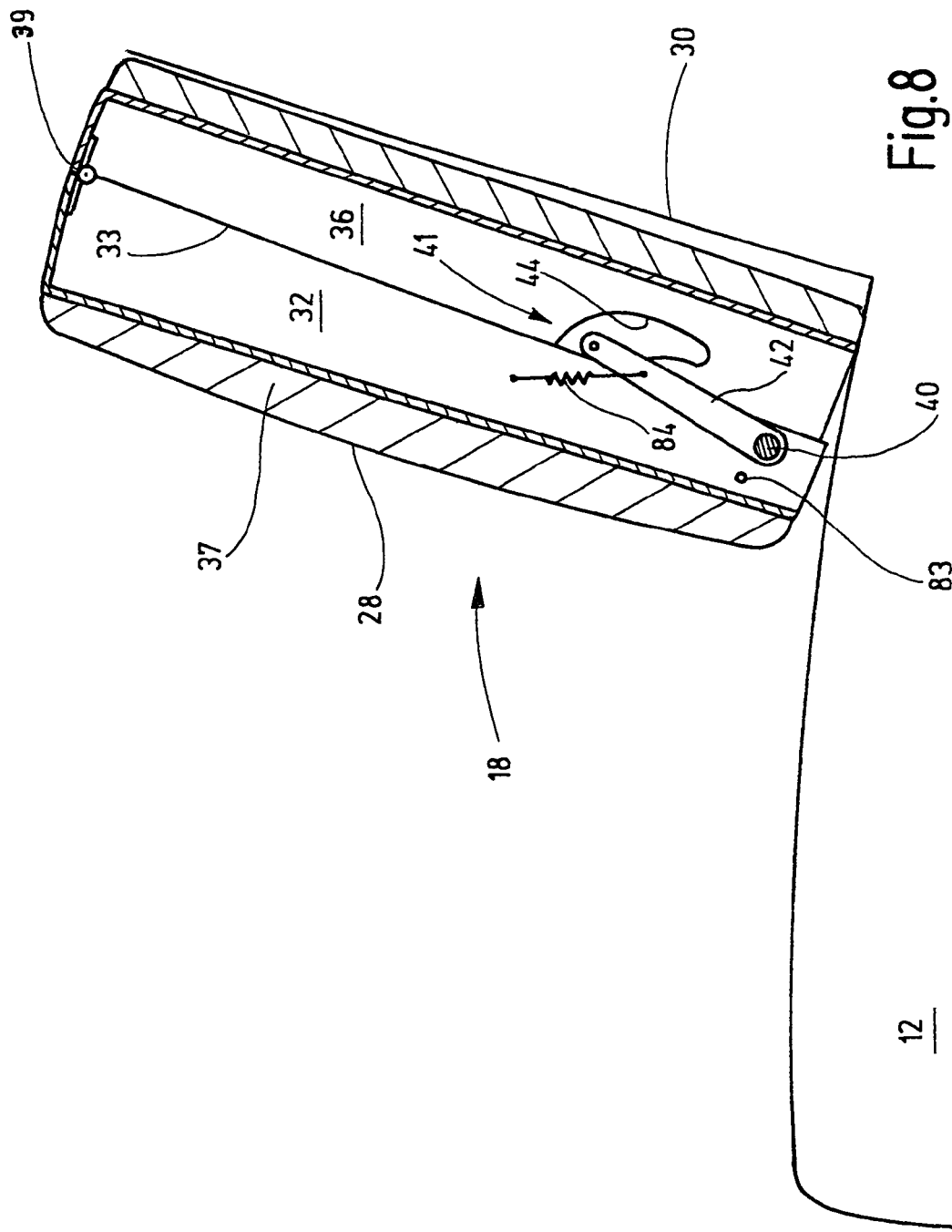

FIGS. 7 and 8 show another embodiment of the mechanism 26 for moving the two parts 22, 23 of the armrest 18 toward each other. The control lever 42 in this case is a one-arm control lever that is pivoted directly on the axle rod 40.

In the direction of the end faces 24, 25, inside the center armrest formed by the lower part and the upper part 22, 23 there is a stationary stop pin 83 for the control lever 42. The stop pin 83 can be placed on a bracket, for example, such as the bracket 51, which is not shown in FIGS. 7 and 8 so as to reveal the stop pin 83 and the control lever 42, as well as their interworking. By means of a tension spring 84, the control lever 42 is pretensioned against the stop pin 83. For this, the tension spring is anchored on the control lever 42 at one end and on the side wall 32 at the other, as shown.

Moreover, as already described, the control lever 42 similarly carries the contour-following pin 48, which engages in the pocket 41 to follow the contour of the cam track 44. Since the lever 43 swivels in the opposite direction as compared to the control lever 42 of FIG. 4, the pocket 41 also is consequently oriented the other way round.

When the center armrest 18 is folded down, the control lever 42, as shown, is largely vertical so that the upper part 23 can be supported on the axle rod 40 by way of the cam track 44 and the control lever 42. When swung up into the position of FIG. 8, at first the cam track 44 slides along the contour-following pin 48 and allows the upper part 23 to approach the lower part in the region of the rear edge; in other words, the armrest 18 begins to fold together. At some time in the course of the swivel movement, the upper edge 33 will emerge the contour-following pin 48 so that the control lever 42 is lifted by the stop pin 83 during further movement. The end position is shown in FIG. 8.

It will be understood that the control lever 42 can be adjustable in length, in the same way as was explained in connection with the control lever 42 as shown in FIG. 4. For this, it is enough to mount the control lever 42 on the axle rod 40 in the region of the lower borehole 56, for example, as shown in FIG. 6, and also to omit the coupling brace 43. Otherwise, the mode of operation has been explained in connection with FIG. 6.

From the foregoing, it can be seen that a center armrest for rear seat backs of cars is provided that consists of an armrest upper part and an armrest lower part that are joined together by means of a hinge. The hinge is located at the end face of the center armrest. Inside the essentially hollow center armrest, there is a control mechanism by which the thickness of the center armrest is preferably automatically regulated when the center armrest is swiveled down from the out-of-use position, in which it functions as part of the seat back, into the armrest position.

The invention claimed is:

1. A motor vehicle seat comprising:
    a seat back (13) having left and right sections (16, 17) which define a generally rectangular intermediate space therebetween,
    an armrest (18) disposed in said intermediate space for movement between a folded up position between said left and right sections (16, 17) and a folded down position extending forwardly from the seat back (13),
    said armrest (18) being divided in a lengthwise direction into two parts (22, 23), one part forming a lower part (22) of the armrest and the other part forming an upper part (23) of the armrest when the armrest is in said folded down position,
    said upper part (23) of said armrest having a cushioned armrest surface (34) facing upwardly when the armrest is in said folded down position and extending substantially along the length of said upper part (23),
    a link (39) adjacent one end of said two parts (22,23) in the form of a hinged joint (39) having a pivot axis in fixed relation to said two parts (22,23) joining said two parts (22,23) together for relative pivotal movement about said hinged joint pivot axis, and
    a mechanism (26) for pivoting said two parts (22,23) relative to each other about said fixed hinged joint pivot axis and positioning ends of the two parts (22, 23) remote from the hinged joint (39) away from each other when the armrest is in the folded down position.

2. A motor vehicle seat of claim 1 in which said armrest (18) is mounted for swivel movement about a fixed pivot axis (40) extending horizontally across said intermediate space transversely to a longitudinal axis of the vehicle.

3. A motor vehicle seat of claim 2 in which said hinged joint (39) pivot axis is parallel to the fixed pivot axis (40) about which said armrest (18) is mounted for swivel movement.

4. A motor vehicle seat of claim 2 in which said pivot axis (40) is located adjacent a lower edge of said seat back (13).

5. A motor vehicle seat of claim 2 in which said pivot axis (40) is located adjacent a surface of said seat back (13) facing the user.

6. A motor vehicle seat of claim 2 in which said pivot axis (40) is formed by a rod.

7. A motor vehicle seat of claim 1 in which said upper part (23) of said armrest has two side walls (36) on opposite lateral sides thereof and an endwall (24) at an end thereof.

8. A motor vehicle seat of claim 1 in which said lower part (22) of said armrest has a cushioned surface which faces the same direction as the seat back (13) when said armrest is in the folded up position.

9. A motor vehicle seat of claim 1 in which said lower part (22) of said armrest has two side walls (32) on lateral sides thereof and one end wall (25) at an end thereof which faces upwardly when the armrest is in said folded up position.

10. A motor vehicle seat of claim 1 in which hinged joint (39) disposed at a forward end of the armrest which faces upwardly when the armrest is in said folded up position.

11. A motor vehicle seat of claim 1 in which said upper part is telescopically engageable with the lower part (22) of the armrest.

12. A motor vehicle seat of claim 1 in which said mechanism (26) is operable for automatically positioning the upper part of the armrest a predetermined distance away from the lower part of the armrest when the armrest is moved to the folded down position.

13. A motor vehicle seat of claim 1 in which said mechanism (26) is operable for swiveling the upper part (23) of the armrest relative to the lower part a selectively adjustable distance as an incident to movement of the armrest to the folded down position.

14. A motor vehicle seat of claim 1 in which said mechanism (26) has at least one cam track (44) in at least one of the armrest parts (22, 23).

15. A motor vehicle seat of claim 1 in which said mechanism includes two cam tracks disposed adjacent side walls (32, 36) of the armrest.

16. The motor vehicle of claim 1 in which said cushioned surface (34) extends from a forward end of said upper part to an end adjacent said seat back (13) when said armrest (18) is in said folded down position.

17. A motor vehicle seat comprising:
    a seat back (13) having left and right sections (16, 17) which define a generally rectangular intermediate space therebetween,
    an armrest (18) disposed in said intermediate space for movement between a folded up position between said left and right sections (16, 17) and a folded down position extending forwardly from the seat back (13),
    said armrest (18) being divided in a lengthwise direction into two parts (22, 23), one part forming a lower part (22) of the armrest and the other part forming an upper part (23) of the armrest when the armrest is in said folded down position, a link (39) adjacent one end of said parts for joining said parts (22, 23) together for relative movement, and a mechanism (26) for positioning ends of the two parts (22, 23) remote from the link (39) away from each other when the armrest is in the folded down position, said mechanism (26) having at least one cam track (44) in at least one of the armrest parts (22,23) and a cam track (44) disposed in said upper part (23) of the armrest.

18. A motor vehicle seat comprising:

a seat back (13) having left and right sections (16, 17) which define a generally rectangular intermediate space therebetween, an armrest (18) disposed in said intermediate space for movement between a folded up position between said left and right sections (16, 17) and a folded down position extending forwardly from the seat back (13), said armrest (18) being divided in a lengthwise direction into two parts (22, 23), one part forming a lower part (22) of the armrest and the other part forming an upper part (23) of the armrest when the armrest is in said folded down position, a link (39) adjacent one end of said parts for joining said parts (22, 23) together for relative movement, and a mechanism (26) for positioning ends of the two parts (22, 23) remote from the link (39) away from each other when the armrest is in the folded down position, said mechanism (26) including at least one cam track (44) in at least one of the armrest parts (22,23) and a control lever (42) that interacts with said cam track (44) during movement of said armrest between said folded up and folded down positions.

19. A motor vehicle seat of claim 18 in which said control lever (42) has a relatively adjustable effective length.

20. A motor vehicle seat of claim 18 in which said control lever (42) is movable in said lower part (22) of the armrest about an axis (47, 59) parallel to said pivot axis (40).

21. A motor vehicle seat of claim 18 in which said control lever (42) comprises two lever arms, one lever arm (45) being in interactive engagement with said cam track (44) and the other lever arm (46) being pivotably connected to a fixed support (51).

22. A motor vehicle seat of claim 21 in which said one lever arm (45) that interacts with said cam track (44) was an adjustable effective length.

23. A motor vehicle seat of claim 18 in which said control lever (42) is formed by a one arm lever.

24. A motor vehicle seat of claim 23 in which said one arm lever (42) is mounted for pivotal movement which is limited by a fixed stop (83) within said armrest, and a spring (84) for resiliently urging said one arm lever in a direction toward engagement with said fixed stop.

25. A motor vehicle seat of claim 23 in which said one arm lever has an adjustable effective length.

26. A motor vehicle seat of claim 18 in which said one arm lever (42) comprises two elongated parts (52, 53) that are guided for movement one on the other.

27. A motor vehicle seat of claim 26 including a spring (71) for biasing said lever parts (52, 53) in a lengthwise direction relative to each other.

28. A motor vehicle seat of claim 26 including a detent device (67, 68) for maintaining the lever parts (52, 53) in a fixed adjusted position with respect to each other.

29. A motor vehicle seat of claim 28 including an activating button (22) that is selectively operable to release said detent device (67, 72).

30. A motor vehicle seat of claim 28 in which said detent device (67, 72) positively locks said lever arm against forces incurred by a user bearing downwardly on the armrest (18).

31. The motor vehicle seat of claim 28 in which said seat back (13) is a rear seat of a motor vehicle.

32. A motor vehicle seat comprising:

a seat back (13) having left and right sections (16, 17) which define a generally rectangular intermediate space therebetween, an armrest (18) disposed in said intermediate space for movement between a folded up position between said left and right sections (16, 17) and a folded down position extending forwardly from the seat back (13), said armrest (18) being divided in a lengthwise direction into two parts (22, 23), one part forming a lower part (22) of the armrest and the other part forming an upper part (23) of the armrest when the armrest is in said folded down position, a hinged joint adjacent a forward end of said two parts (22,23) remote from said seat back (13) when said arm rest is in said folded down position joining said two-parts (22,23) together for relative pivotal movement about said hinged joint (39), a mechanism (26) for pivoting said two parts (22,23) relative to each other about said hinged joint (39) and positioning ends of the two parts (22,23) remote from the fixed joint (39) away from each other when the armrest (18) is in the folded down position, and one of said two parts (22) being pivotably connected to said seat back (13) adjacent an end of said one part (22) remote from said hinged joint (39) and the other of said two parts (23) being coupled to said one part (22) by said mechanism (26) free of connection with said seat back (13).

\* \* \* \* \*